(12) United States Patent
Willman et al.

(10) Patent No.: US 6,592,694 B1
(45) Date of Patent: Jul. 15, 2003

(54) FLEXIBLE BELT PRESSING LAMINATING APPARATUS AND METHOD

(75) Inventors: Tarmo Willman, Kaarina (FI); Lars-Henrik Heselius, Pargas (FI); Esko Brunila, Parainen (FI)

(73) Assignee: Paroc Group Oy AB, Vantaa (FI)

( * ) Notice: Subject to any disclaimer, the term of this patent is extended or adjusted under 35 U.S.C. 154(b) by 0 days.

(21) Appl. No.: 09/806,446

(22) PCT Filed: Sep. 30, 1999

(86) PCT No.: PCT/FI99/00808

§ 371 (c)(1),
(2), (4) Date: Mar. 30, 2001

(87) PCT Pub. No.: WO00/18576

PCT Pub. Date: Apr. 6, 2000

(30) Foreign Application Priority Data

Sep. 30, 1998 (FI) .................................................. 982123

(51) Int. Cl.⁷ .............................................. B32B 31/20
(52) U.S. Cl. ......................................... 156/64; 156/228
(58) Field of Search .............................. 156/228, 583.5, 156/583.3, 358, 64; 100/306, 308, 309, 310, 311, 312

(56) References Cited

U.S. PATENT DOCUMENTS

| | | | |
|---|---|---|---|
| 3,972,766 A | | 8/1976 | Fontvieille ................... 156/358 |
| 4,645,632 A | * | 2/1987 | Bottger et al. ............... 100/154 |
| 5,183,525 A | * | 2/1993 | Thomas ....................... 156/210 |
| 5,711,214 A | * | 1/1998 | Lauderbaugh et al. ...... 100/154 |

FOREIGN PATENT DOCUMENTS

| | | |
|---|---|---|
| EP | 0 388 029 A2 | 9/1990 |
| JP | 10-113800 | 5/1998 |
| WO | WO 98/42503 | 10/1998 |

* cited by examiner

*Primary Examiner*—Richard Crispino
*Assistant Examiner*—George R. Koch, III
(74) *Attorney, Agent, or Firm*—Connolly Bove Lodge & Hutz LLP

(57) ABSTRACT

The invention relates to a method and an apparatus for joining surface layers and a core to form an element between two press platens, at least one of which is flexible and acted on by several power units that can be adjustable individually or in groups.

9 Claims, 4 Drawing Sheets

FLEXIBLE BELT PRESSING LAMINATING APPARATUS AND METHOD

BACKGROUND OF THE INVENTION

Sandwich elements have been commonly used in buildings and in ships for many years. They were first used in the form of thin concrete layers separated by an isolating layer, the core. Very often there was a mechanical connection between the concrete layers because the core usually could not transfer the forces necessary for holding the element together. Later sandwich elements were introduced in which the surface layers were made of thin layers, e.g. sheet-metal or laminate. With thin and flexible surface layers, a need arose for rigid cores which were able to transfer forces. This need could be met with cellular plastics, but the need, especially for fire protection and sound isolation, led to mineral wool becoming an important core material.

To make the mineral wool core rigid enough it is sometimes sufficient to increase its density. However it is more customary to change instead the orientation of the fibres in the core so that the main direction of the fibres is orthogonal to the surface plane. Using such a fibre orientation, allows the board to withstand deformation better when it is loaded orthogonally to its plane compared to a mineral wool core that is not reoriented. Reorientation can be carried out using a so called lamina technique, i.e. the normal hardened mineral wool boards are divided into narrow strips, which are rotated 90° around their own axis and assembled in a new sheet-type construction. Other techniques for carrying out the reorientation also exist.

Development has since moved towards using sandwich elements in which e.g. sheet-metal is used as a surface layer not only in partition walls as before, but also in outer walls and roofs. This has placed much higher demands on the quality of the elements, in terms of both appearance and especially strength characteristics, while at the same time the dimensions of the elements also increased many times over previous dimensions.

The principle of manufacturing sandwich elements of this kind is described in WO 98/42503.

The glue that attaches the core to the surface layers is preferably of a thermosetting type, but it may also be self-curing or hardened by some other means, e.g. ultrasound. In a press operation, if needed during heating or other procedure, the surface layers are attached to the mineral wool layers and the glue is cured. When manufacturing sandwich elements, the pressing measure is usually controlled by being carried out against a stopping block which defines the distance between the pressing plates and thereby the thickness of the element during the pressing.

This method can give a poor result when using thin sheet-metal, with faults such as rough surface layers and weak glue joints. Functionally this causes visual problems, because even small roughness in the form of ripples and bosses are clearly visible, especially on totally smooth elements. The strength also deteriorates, which usually is not permissible. To eliminate these problems, the amount of glue, the thickness of the surface layers, the density of the mineral wool layer, the binding agent concentration etc. has been increased or the surface has been additionally machined. Additional glue and binding agent contents result however in inferior fire properties. Another fact is that the product will be much more expensive, and, besides, the result is often not good enough or predictable. Not the least serious problem is, that more expensive measures have to be taken also on elements which have no obvious weaknesses.

In the light of this, extensive and thorough studies and experiments have been made, which have given rise to the invention according to WO 98/42503. According to this publication, the pressing, when needed under heating, is not carried out against a stopping block to a predetermined thickness, but by using a pressure within a predetermined range, $P_{max}-P_{min}$, the size of which is determined by the included components, the mineral wool laminas, the surface layers and the glue. In this case both the terminal points of the interval are determined by two different phenomena: the lower limit for the pressing pressure being the lowest pressure needed so that no adhesion breakage will occur; the upper limit being determined by how much the core material withstands while retaining its structural properties.

An important problem remains in this known method, i.e. how the pressing pressure can be kept locally within these limits over the press platen. The problem is accentuated by the reorientation of the mineral wool core, which causes systematical variations between different parts of the core, irrespective of the system used to achieve reorientation. One reason for this is the strength requirement of the element. The core construction must not be destroyed by overpressing, but, on the other side the attachment of the top layer must be guaranteed. The visual appearance of the element is also of importance since the human eye is disturbed by even very small bosses on the surface of the element.

SUMMARY OF THE INVENTION

Yet another problem with the pressing method lies in the flatness and parallelness of the press platens. Usually the structures are huge, sizes of up to 15 m² not being unusual, and the demands often include a requirement that deviations from smoothness and parallelness shall be less than 0.2 mm. The press platens are usually also heated and problems especially arise with traditional presses in which the displaceable press platen often becomes slightly bent.

The invention solves the aforesaid problems with a method and an apparatus according to the accompanying patent claims.

When thin surface layers, e.g. made of sheet-metal, must be attached to a core made of reoriented mineral wool in a sandwich element, according to the invention a laminating apparatus is used in which at least one of the press platens is flexible and is acted on by many power units, the influence of which can be controlled individually or in groups, it then being possible to control the pressing pressure in different parts of the press platen and keep it within the aforesaid limits $P_{max}-P_{min}$.

In the simplest embodiment the other press platen is fixed and flat.

Before pressing is performed, the power units are usually adjusted so that the flexible press platen becomes flat and preferably also parallel to the other press platen. For this purpose the power units may be double-acting.

In some applications it is preferable that both press platens are flexible and separately acted on by several power units, the influence of which during the pressing can be controlled individually or in groups.

Then the press platens can be formed, in the first instance with a curved cross-section. Both press platens must then be bent in the same direction and by the same amount. The element then becomes accordingly curved or dome shaped, which may be desirable in certain applications. Partly these dome shaped elements give an architectonic effect, partly the dome shape means that smaller deviations from an otherwise regular plane will not be as clearly visible as in the case of a flat element.

In a normal case the influence of the power units shall be controlled in such a manner that both flexible press platens becomes both parallel to each other and flat. As aforesaid, the aim can be elements, which have curved cross-sections and in these cases the press platens must anyway be parallel.

By continuous pressing, the optimal curing of the glue may require the press platens to be flat but convergent or divergent.

For an optimal glue effect it is necessary for the press platens to exert a pressure against the press object within predetermined limits, in which the lower limit is determined by the lowest pressure, Pmin, which is needed so that when tearing apart the connection, adhesive failure will not occur, and the upper pressure, Pmax, is determined by the condition that the proportionality limit of the core material not shall be reached.

The limits are, at their broadest, Pmax and Pmin respectively, but they may also, when the practical possibilities in a specific case allow, be set so that the range becomes smaller, e.g. so that the lower press limit becomes Pmin+0.25*(Pmax−Pmin) and the upper press limit becomes Pmax−0.25*(Pmax−Pmin). In most cases it is both possible and desirable to accelerate the curing of the glue during the pressing action by heating from one or both of the press platens depending if there are surface layers on one or on two sides. Other types of accelerating effect can also be considered depending on the character of the glue.

It is understood, that if there are surface layers on both sides of the core, the heating or other curing accelerating influence must also be double sided, otherwise it is enough if it comes from that side where the surface layer is situated.

This potential acceleration allows a somewhat slower glue to be chosen, which makes the process less sensitive to disturbances, while maintaining productivity, because the glue is rapidly cured when the press object already is situated between the press platens.

Another way of utilizing heated press platens is to cool the surface layers and/or the glue to strongly retard the curing of the glue until it is correctly situated in the press.

Yet another way to accelerate the curing of the glue is to preheat the surface layer or layers, which can be done by blowing in warm air, by infrared heating or, when the surface layers are made of metal, by inductive heating.

Irrespective of how the accelerating of the curing is done it may be advantageous to be able to adjust it over the surface of the platen or platens respectively. It is also preferable, in the case of heated platen or platens, to be able to detect the temperature of the platen or the platens and how the temperature is distributed.

The heating of the surface platens may also be made in a separate step before they are fed into the press. This will also achieve other benefits because internal tensions and respectively changed dimensions of the surface layers by the heating can be dissolved and smoothened.

From many points of view it is advantageous that the press object is transported continuously through the press, partly because a higher production speed can be achieved and partly because elements can also be produced which are longer than the press or vice versa, allowing the press to be kept short.

Continuous production is possible in two ways, either by preparing separate press objects of certain length before the pressing or by preparing a continuous press object. In both cases, these are then taken continuously into, through and out of the press. To achieve continuous production in a press with press platens it is required that the press object be placed between two belts. For a press object that is taken through the press to be subjected to a pressure, the distance between the press platens must be less than the combined thickness of the press object and the belts in an unloaded condition.

The invention also concerns a press for connecting surface layers and a core in an element where the surface layers and the core are brought together to a press object after adding a glue layer between the surface layers and the core and then applying a pressure between two press platens. The press according to the invention is characterized in that at least one of the press platens is flexible and is acted on by several power units, which have been arranged between the press platen and a fixed supporting structure so that they can produce forces that can be transferred from the fixed supporting structure to this press platen, and the influence of which can be controlled individually or in groups.

The power units may be of a pneumatic or hydraulic type, e.g. simple flexible tubes or cushions, but also proper piston-cylinder apparatuses. There are also other possibilities. Thus the power units may be threaded spindles or eccentrics, or they may be of electromechanical type.

The flexibility of the press platen can not be stated exactly, but it must be so flexible that its form can be changed considerably with those forces that the power units can produce. On the other side the press platen must be rigid enough to prevent too sharp bends arising in the surface layer of the press object. These must in turn be adapted to the properties of the press object. To one versed in the art it is probably possible in an actual case to use a few simple calculations and experiments to determine both the capacity of the power units and within which limits the flexibility of the press platen must lie. A good rule for the calculations is that the height and respectively the depth of the bends should be at most one thousand of its diameter.

The supporting structure against which the power units must act may be a platen or a framework made of beams or corresponding.

If the power units are elongated, e.g. they are pressure hoses, it is preferable that every or possibly every pair of them is controlled separately. If the power units are not elongated, but are arranged in rows, it is preferable that every such row is controlled separately.

The controlling must be adapted to the type of power unit used. If they are hydraulic, the adjustment is naturally performed by controlling the pressure of the pressure medium that feeds them. If the power units are of a different type, the size, and sometimes also the direction of the power with which they act on the flexible press platen, must be measurable, e.g. with some kind of detectors.

In a press it is normally preferable that the other press platen is smooth, preferably also stationary. The flexible press platen including its power units may then with preferably a control apparatus be made smooth and/or parallel to the other press platen.

Such a control apparatus may be more or less self-acting. To make the flexible press platen smooth, its deviation from smoothness is only measured in the simplest case and the force with which the different power units act on the platen is then varied so that the deviations are sufficiently counteracted.

Such a measurement can be made with dial gauges, electrical detectors or with optical, preferably laser optical, systems. The measuring can also be made with a calibrated press object which before the process is started is taken into the press and makes the setting easier.

In a press according to the invention both press platens may be flexible and both can be acted on by several power units, which are arranged between these and fixed supporting structures in such a way that they can produce forces which can be transferred from the fixed supporting structures to the press platens and the influence of which can be controlled individually or in groups, and that the press is such constructed that the power units can make the press platens parallel and/or smooth.

To be able to ensure an optimal gluing action it is required that the pressure that is acting on the press object in the press can be read and manually or automatically be kept within those limits which one in advance has have been able to determine for the components in question.

The power units may be elongated with a length which corresponds to the dimension of the flexible press platen in one direction. The elongated power units may be tubes. If cushions or hydraulic cylinders are selected instead, it is a beneficial to place these in rows. It is convenient that the elongated pressure units or rows of individual pressure units are arranged transversely to the flexible press platen, because the typical need is to eliminate its bending longitudinally. In many cases some other design is more advantageous, e.g. a herringbone pattern. If a controlled bending of the press platen is preferable, and preferably so that it gets a curved cross-section, the elongated power units or rows of power units must instead be arranged in the longitudinal direction of the press platen.

Usually it is preferable to accelerate the curing of the glue in some way when the press object is already situated between the press platens in the press by heating. Then it is required that one of the press platens or both are heated, e.g. with a circulating heating medium. Which medium is chosen depends mainly on the temperature the press platen or press platens shall obtain. This in turn depends on the properties of the glue and on the need to accelerate the process.

To be able to rapidly change to another thickness of the press object, it is preferable that the supporting structure, or in the case of two flexible press platens, at least one of the supporting structures is arranged to take different positions, e.g. defined by stopping blocks. The supporting structure can be a framework which with hydraulic cylinders can be lifted from and lowered against the stopping block. A series of stopping blocks can be used for different production situations or rather such stopping blocks may be used that easily can be adjusted for different production situations.

To allow the flexible press platen or press platens to change form without a net pressure arising against the press object, the power units must be double-acting so that they can not only apply repulsive forces but also attractive forces.

The invention is advantageously applicable to a situation where the core material is made of mineral wool, preferably lamina oriented or otherwise reoriented to give better resistance against pressure loads orthogonally to the main plane of the core. Mineral wool cores of a lamina type and structures with properties of the same kind show namely to a very high degree that problematical picture which the invention starts from, especially if the density is relatively low, as it should be for economical reasons. Choosing mineral wool as core material is often due to the fact that it is cost-efficient, perpetual and shows good fire properties.

Other core materials may, however, be appropriate in special applications, e.g. polystyrene cellular plastic and phenolic cellular plastic.

EXAMPLE

As a typical case an example is shown of continuous pressing in a press with a working length of 5 m. The upper press platen of the press was flexible while the lower was rigid. The power units between the flexible press platen and its supporting structure was 16 tubes which extended across the press platen with a spacing of 330 mm. They were two and two connected to a hydraulic system with an individual pressure control to every tube pair. Both press platens had an internal system of bores in which water of temperature 92° C. flowed, which gave the press platens a temperature close to the press surfaces of 85.5° C.

The press object was transported through the press with two conveyor belts. By pressing against a calibrating element the pressure in the different tube pairs was adjusted so that the flexible press platen was flat and parallel to the other press platen at a pressing pressure of 30–40 kPa.

The press object was a core of laminate oriented mineral wool of rockwool type with a density of 90 kg/m$^3$, the values of the density is normally for this case 70–120 kg/M$^3$, commonly 90–100 kg/m$^3$. The binding agent concentration was in the example 2.5%. It is normally 2–4%. The press object included a plastic coated steel plate layer on both sides. The thickness of the plate was 0.5 mm on one side and 0.6 mm on the other side.

In the example the length of the press object (a future sandwich element) was 7 m and the width was 1.2 m. Lengths of 6–10 m are typical, but the element may also be more than 10 m long. The width is normally 0.8–1.2 m.

Between the sheet-metal layer and the core was a glue layer which consisted of a two-component polyurethane glue of about 175 g/m$^2$.

For this press object, the appropriate pressures were Pmin=25 kPa and Pmax=50 kPa. The curvature of the element was <0.2 mm/m and the adherence between the surface layer and the core was adequate over all surface of the element. The pressure of the flexible press platen against the press object was set to 35 kPa, after which the pressing pressure in the power units situated on different positions over the press platen was controlled so that possible local deviations from this value stayed within the aforesaid limit values.

DETAILED DESCRIPTION OF THE INVENTION

The invention will be described in detail with the aid of FIGS. 1–4.

The principle of the invention will be illustrated with reference to FIG. 1.

Figure 1:
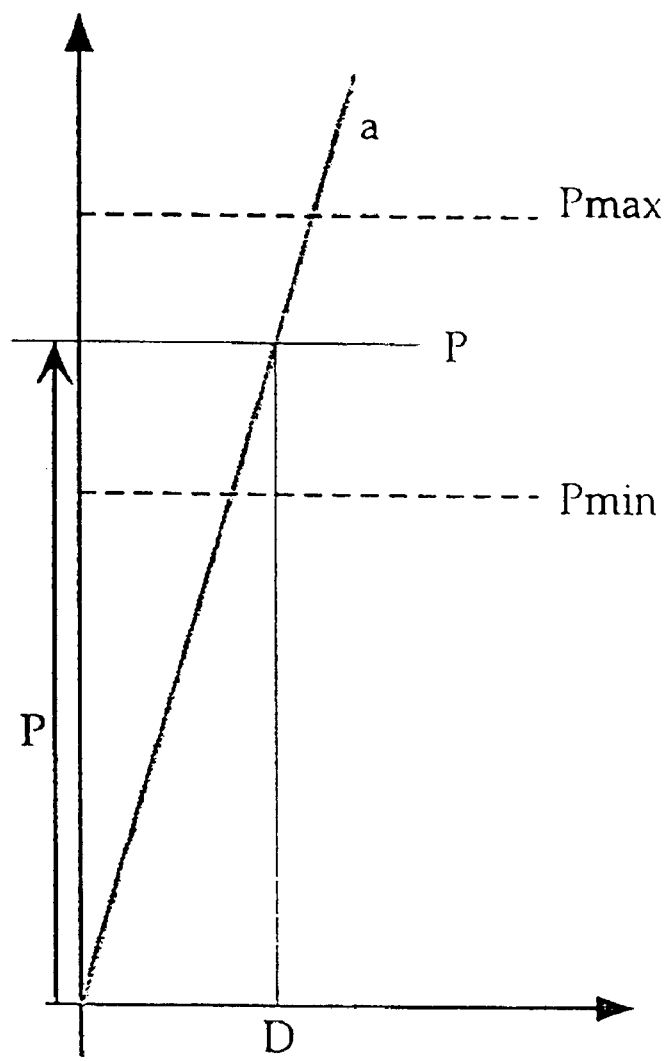
FIG. 1 is a graphical representation according to one embodiment of the invention.

The diagram in FIG. 1 is a graphical representation of one embodiment according to the invention. The straightening of the flexible press platen has been made with power units, i.e. the press platen has been calibrated before the press operation, after which the press object in principle can be pressed with a predetermined pressure all over its area.

Possible local deviations from this pressure will then be kept within the limits $P_{max}$–$P_{min}$ by controlling the power units individually or in groups.

Figure 2A:
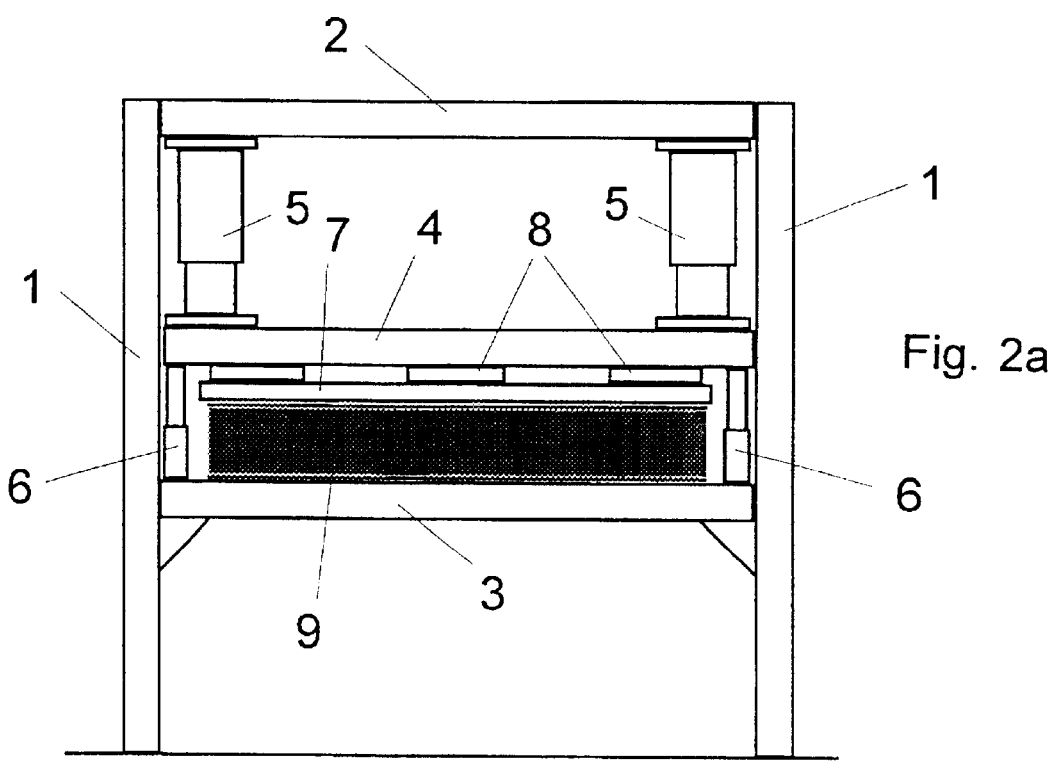
FIG. 2a is a cross-sectional view of an apparatus according to one embodiment of the invention.
Figure 2B:
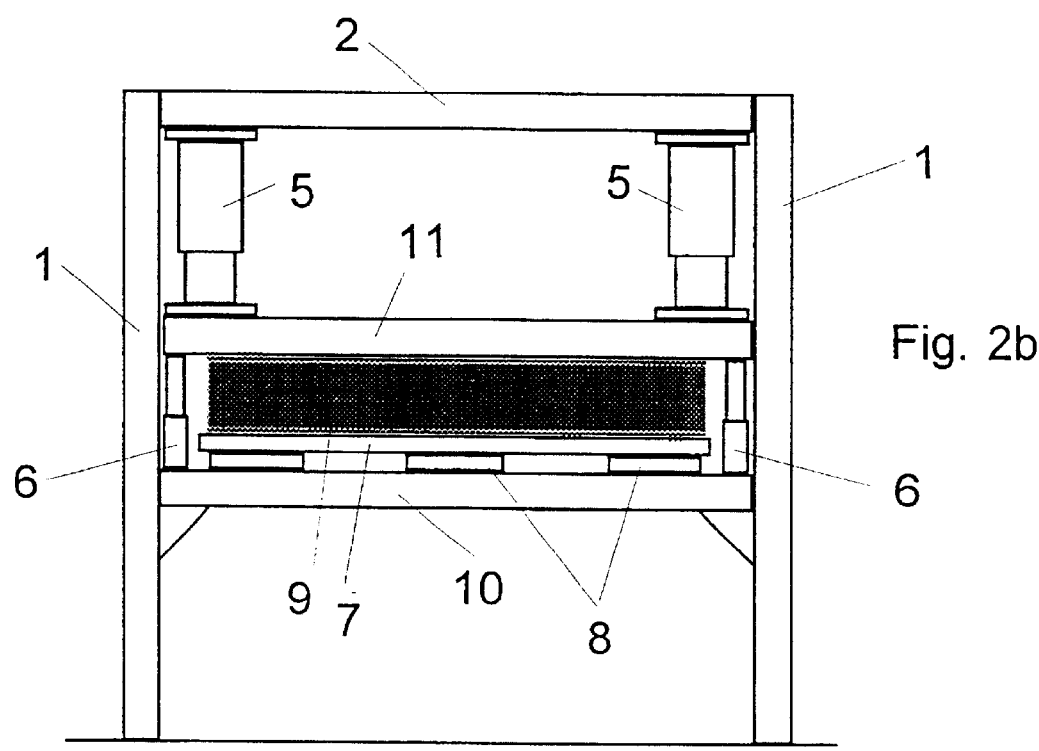
FIG. 2b is a cross-sectional view of an apparatus according to another embodiment of the invention.
Figure 3:
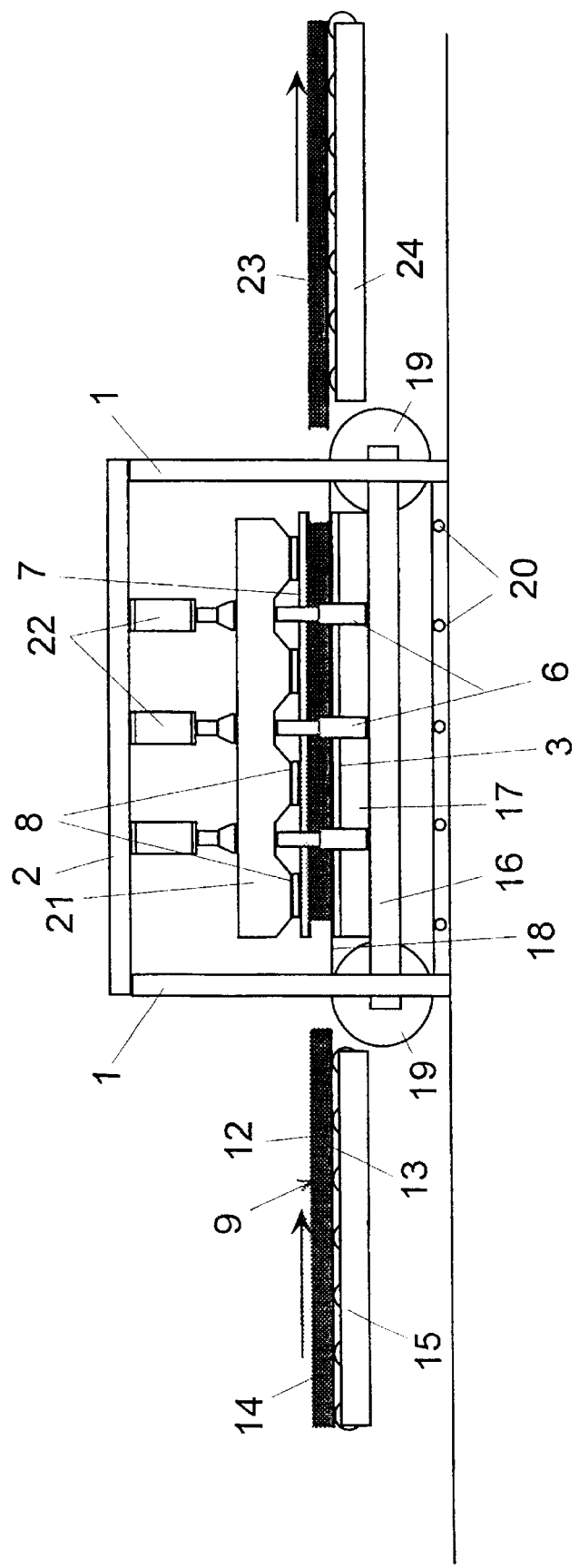
FIG. 3 is a side view of an apparatus according to one embodiment of the invention.
Figure 4:
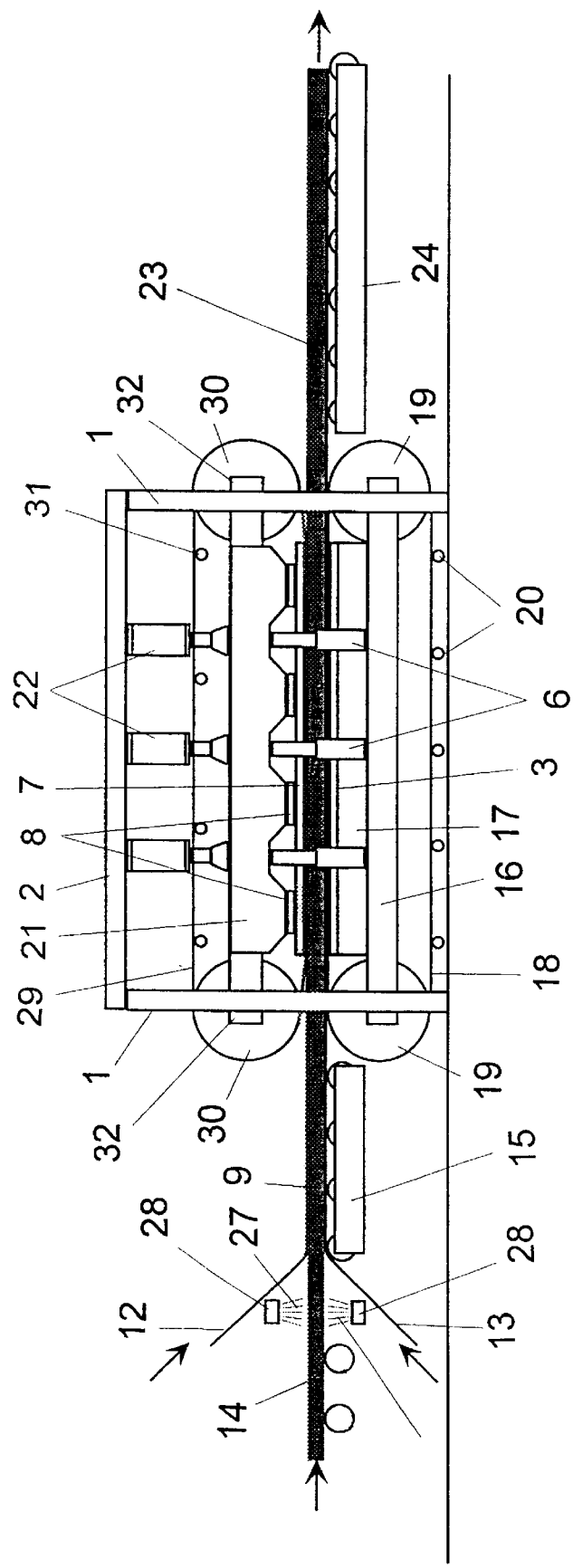
FIG. 4 is a side view of an apparatus intended for continuous pressing of a continuous press object.

FIGS. 2a, 2b, 3 and 4 are all diagrammatic representations of different embodiments of the apparatus according to the invention. FIGS. 2a and 2b show cross-sections while FIGS. 3 and 4 show longitudinal views. FIG. 2a shows two columns (1) which are connected by an upper piece (2) and a lower press platen (3). An upper framework (4) is pressed by hydraulic cylinders (5) against adjustable stopping blocks (6). In connection with the upper framework (4) there is an upper, flexible press platen (7) which by power units (8) is pressed against the press object (9).

FIG. 2b shows a corresponding apparatus, but with that difference that the flexible press platen (7) here is arranged in connection with a lower framework (10) and is pressed from this against the press object (9) by the power units (8).

In FIG. 3 reference number (15) represents a conveyor with driving rollers on which a press object (9), a future sandwich elements (23), lies. The press object consists of an upper surface layer (12) and a lower surface layer (13) between which there is a core of reoriented, e.g. lamina oriented, mineral wool (14). Between the surface layers and the core there are layers of glue, which are not shown in the figure.

The press itself consists of a framework with columns (1) and an upper piece (2). In the lower part of the frame a lower press frame (16) is assembled. On this there lies a press bed (17) and a press platen (3). Over the press platen (3) extends a conveyor belt (18). The conveyor belt (18) extends further over two rollers (19). The lower part of the belt is supported by supporting rollers (20).

In the upper part of the framework an upper press frame (21) is suspended in double-acting hydraulic cylinders (22). From the upper press frame a flexible press platen (7) is suspended from power units (8).

The adjustable stopping blocks (6) rest against the lower press frame (16) and are so placed that they can meet the upper press frame (21) when this is pressed down by the hydraulic cylinders (22).

This press works so that the hydraulic cylinders (22) first lift the upper press frame (21) with the flexible press platen (7) connected to it to such a level that the distance between this and the lower press platen (16) is bigger than the combined thickness of the press object and the conveyor belt (18). Next the press object (9) is taken, by means of the conveyor (11) and the conveyor belt (18), between the lower press platen (3) and the flexible press platen (7). Next the hydraulic cylinders (22) press down the upper press frame (21) against the stopping blocks (6), after which the power units (8) further press the flexible press platen (7) against the press object with controlled pressures.

After the pressure has acted for the time needed for the glue to cure, the upper press frame is again raised, once the pressure from the power units has ended, so that the press object (9), which has now become a sandwich element (23), can be fed out. This takes place with the conveyor belt (18) out on the conveyor (24) at the same time that a new press object (9) is fed in from the other side.

FIG. 4 shows an apparatus according to the invention which is intended for the continuous pressing of a continuous press object. A continuous core (14) of laminate oriented mineral wool is moved forward on a roller line. From two rollers, which are not shown in the figure, comes an upper (12) and a lower (13) surface layer made of plastic-coated steel plate down and respectively up against the continuous core. Before the surface layers are brought together with the core, the space between these is injected with a glue layer (27) from nozzles (28).

The, in this case continuous, press object (9) thus formed is taken with the conveyor belt (15) towards the press in between the lower belt (18), with its driving and turning rollers (19) and its supporting rollers (20), and the upper belt (29) with its driving and turning rollers (30) and supporting rollers (31).

The press itself consist of a framework with a column (1) and an upper piece (2). In the lower part of the frame is a lower press frame (16) mounted. On this lies a press bed (17) and a press platen (3).

In the upper part of the framework there is an upper press frame suspended from double-acting hydraulic cylinders (22). From the upper press frame suspends a flexible press platen (7) from power units (8). The driving and turning rollers (30) of the upper belt are mounted into brackets (32) projecting from the press frame (21).

The adjustable stopping blocks (6) rest against the lower press frame (16) and are placed so that they can meet the upper press frame (21) when this is pressed downwards by the hydraulic cylinders (22).

The apparatus according to FIG. 4 is thus intended for continuous operation. When the press object (9) between the belts (28, 29) comes in between the lower press platen (3) and the upper flexible press platen (7) it is subjected to a pressure which causes a certain compression. At the same time the surface layers are heated by both the press platens, which are heated by warm water that circulates in bores, not shown in the figure, in the press platens. During the simultaneous effect of the pressure and heating, the glue is cured and converts the press object into a sandwich element (23) which is fed out on the conveyor (24). Because, in the shown embodiment, it is a question of continuous production, the product is later cut into pieces of suitable length. This cutting apparatus is not included in the invention and is also not shown in the figure.

The apparatus according to FIG. 4 can also be used for pressing prepared discontinuous press objects, the length of which consequently does not depend on the press length of the laminating apparatus. The prepared press objects may be longer than the press, but they may also be shorter and may then be fed in closely after each other.

What is claimed is:

1. A method of connecting surface layers and a core to form a sandwich element comprising:

putting together the surface layers and the core to form a press object after adding a layer of glue between the surface layers and the core;

after forming the press object, subjecting the press object to pressing in a press between first and second press platens while the glue is cured, whereby at least the first press platen is flexible and is acted upon by several first power units which are arranged over the first press platen and which are arranged at a relative distance from each other, wherein the first power units act against a fixed supporting structure and a pressing pressure is applied to the press object; and controlling the first power units during the pressing individually or in groups, so that local deviations from the pressing pressure are kept within predetermined intervals between a minimum pressure and the pressing pressure and between the pressing pressure and a maximum pressure, wherein an allowed value for a deviation from the pressing pressure between the minimum pressure and the maximum pressure is selected so that a height of local elevations in a surface of the press object is kept less than one thousand of a diameter of the elevations and, respectively, a depth of local recesses in the surface of the press object is kept less than one thousand of a diameter of the recesses.

2. A method according to claim 1, wherein the power units before the pressing are controlled in such a way that the first press platen becomes flat and also parallel to the second press platen.

3. A method according to claim 2, wherein the second press platen is fixed and flat.

4. A method according to claim 1, wherein one of the first and second press platens is fixed and flat.

5. A method according to claim 1, wherein the second press platen is flexible and separately acted on by several second power units which act against fixed supporting structures and wherein an influence of the second power units during pressing can be adjusted individually or in groups.

6. A method according to claim 5, wherein effects of the first and second power units are controlled so that the first and second press platens become parallel to each other or flat.

7. A method according to claim 3, further comprising accelerating curing of the glue during pressing by heating from at least one of the first and second press platens.

8. A method according to claim 3, further comprising taking the press object continuously through the press between two belts, wherein a distance between the first and second press platens is less than a thickness of the press object and the belts together in an unloaded condition.

9. A method according to claim 1, wherein the second press platen is fixed and flat.

* * * * *